US012606145B2

(12) United States Patent
Kremer et al.

(10) Patent No.: US 12,606,145 B2
(45) Date of Patent: Apr. 21, 2026

(54) METHOD FOR DETERMINING A BRAKING DISTANCE

(71) Applicant: KNORR-BREMSE Systeme für Schienenfahrzeuge GmbH, Munich (DE)

(72) Inventors: Miklos Kremer, Budapest (HU); Ferenc Szekely, Taborfalva (HU); Falk Haehle, Germering (DE); Kiana Rahnema, Dachau (DE)

(73) Assignee: KNORR-BREMSE Systeme für Schienenfahrzeuge GmbH (DE)

( * ) Notice: Subject to any disclaimer, the term of this patent is extended or adjusted under 35 U.S.C. 154(b) by 552 days.

(21) Appl. No.: 17/295,833

(22) PCT Filed: Oct. 29, 2019

(86) PCT No.: PCT/EP2019/079499
§ 371 (c)(1),
(2) Date: May 20, 2021

(87) PCT Pub. No.: WO2020/104148
PCT Pub. Date: May 28, 2020

(65) Prior Publication Data
US 2022/0009468 A1    Jan. 13, 2022

(30) Foreign Application Priority Data

Nov. 20, 2018    (DE) ..................... 10 2018 129 132.9

(51) Int. Cl.
*B60T 17/22*        (2006.01)
*B60T 8/172*        (2006.01)
*F16D 66/00*        (2006.01)

(52) U.S. Cl.
CPC ............ *B60T 17/221* (2013.01); *B60T 8/172* (2013.01); *F16D 66/00* (2013.01);
(Continued)

(58) Field of Classification Search
CPC .... B60T 17/221; B60T 8/172; B60T 2210/30; B60T 2250/04; F16D 66/00;
(Continued)

(56) References Cited

U.S. PATENT DOCUMENTS 6,514,592 B1      2/2003  Hubbard et al.
7,765,859 B2 *    8/2010  Connell .............. B61L 15/0072
73/121
(Continued)

FOREIGN PATENT DOCUMENTS

BR        PI0906530-0 B1 *  7/2009
CN        101980215 B      11/2012
(Continued)

OTHER PUBLICATIONS

International Search Report and Written Opinion for corresponding PCT/EP2019/079499 dated Feb. 13, 2020.

*Primary Examiner* — Helal A Algahaim
*Assistant Examiner* — Merritt E Levy
(74) *Attorney, Agent, or Firm* — Barnes & Thornburg LLP

(57)        ABSTRACT

A method for determining a braking distance of a vehicle, wherein a coefficient of friction (COF)actual between a brake lining and a brake disc is calculated as a function of a tensioning force Fd, a vehicle velocity V and a temperature of the frictional layer Tdisc, wherein the temperature of the frictional layer Tdisc is updated dynamically on the basis of the coefficient of friction COFactual in order to calculate a braking distance which approaches reality.

5 Claims, 2 Drawing Sheets

(52) U.S. Cl.
  CPC ....... *B60T 2210/30* (2013.01); *B60T 2250/04*
      (2013.01); *F16D 2066/001* (2013.01); *F16D*
          *2066/003* (2013.01); *F16D 2066/005*
          (2013.01); *F16D 2066/006* (2013.01)
(58) Field of Classification Search
  CPC ......... F16D 2066/001; F16D 2066/003; F16D
              2066/005; F16D 2066/006
  USPC ...................................................... 701/34.4
  See application file for complete search history.

(56)                    References Cited

U.S. PATENT DOCUMENTS

| | | | | |
|---|---|---|---|---|
| 11,577,712 B2 * | 2/2023 | Gutschi | ................. | B60T 17/221 |
| 2009/0164172 A1 * | 6/2009 | Hartmann | .............. | B60T 13/74 |
| | | | | 702/41 |
| 2011/0029213 A1 | 2/2011 | Itano | | |
| 2014/0046514 A1 * | 2/2014 | Jennek | .................. | B60T 17/228 |
| | | | | 701/20 |
| 2018/0222455 A1 * | 8/2018 | Aldaboos | ............. | F16D 55/225 |
| 2018/0257623 A1 * | 9/2018 | Herden | ..................... | B60L 7/26 |
| 2018/0345930 A1 * | 12/2018 | Yasui | ..................... | B60T 8/172 |
| 2019/0017561 A1 * | 1/2019 | Antanaitis | ............ | B60T 17/221 |

FOREIGN PATENT DOCUMENTS

| | | | | | |
|---|---|---|---|---|---|
| CN | 107229801 A | * | 10/2017 | ............ | G06F 30/15 |
| DE | 102011113024 B4 | | 4/2013 | | |
| EP | 0866923 B1 | | 3/2004 | | |
| EP | 3419879 B1 | * | 5/2020 | ........... | B60T 17/228 |
| JP | H0592760 A | | 4/1993 | | |
| JP | 2019015680 A | | 1/2019 | | |
| WO | 2016079014 A1 | | 5/2016 | | |
| WO | WO-2018193490 A1 | * | 10/2018 | ............. | B61L 21/10 |

* cited by examiner

Fig. 2

METHOD FOR DETERMINING A BRAKING DISTANCE

CROSS REFERENCE AND PRIORITY CLAIM

This patent application is a U.S. National Phase of International Patent Application No. PCT/EP2019/079499 filed Oct. 29, 2019, which claims priority to German Patent Application No. 10 2018 129 132.9, the disclosure of which being incorporated herein by reference in their entireties.

FIELD

Disclosed embodiments relate to a method for determining a braking distance of a vehicle in the case of a friction brake.

BACKGROUND

A braking distance is an important indicator of the braking performance of a braking system of a vehicle. Provided in standard UIC 544-1, for evaluating the braking performance for the purpose of train approval, is a method for determining a braking distance according to the method of temporal increments. This type of conventional determination of the braking distance is however based on the assumption that the coefficient of friction (COF) between a brake pad and a brake disc is constant during the entire determination.

SUMMARY

Therefore, the disclosed embodiments provide a method for increasing the accuracy in determining/estimating a braking distance of a vehicle and, associated therewith, the accuracy of assessing the braking performance of a vehicle.

BRIEF DESCRIPTION OF THE FIGURES

The method according to the disclosed embodiments will be described in relation to the figures, in which:

FIG. 2 shows a flow chart which shows the operations of FIG. 1 in a different illustration.

DETAILED DESCRIPTION

Figure 1:
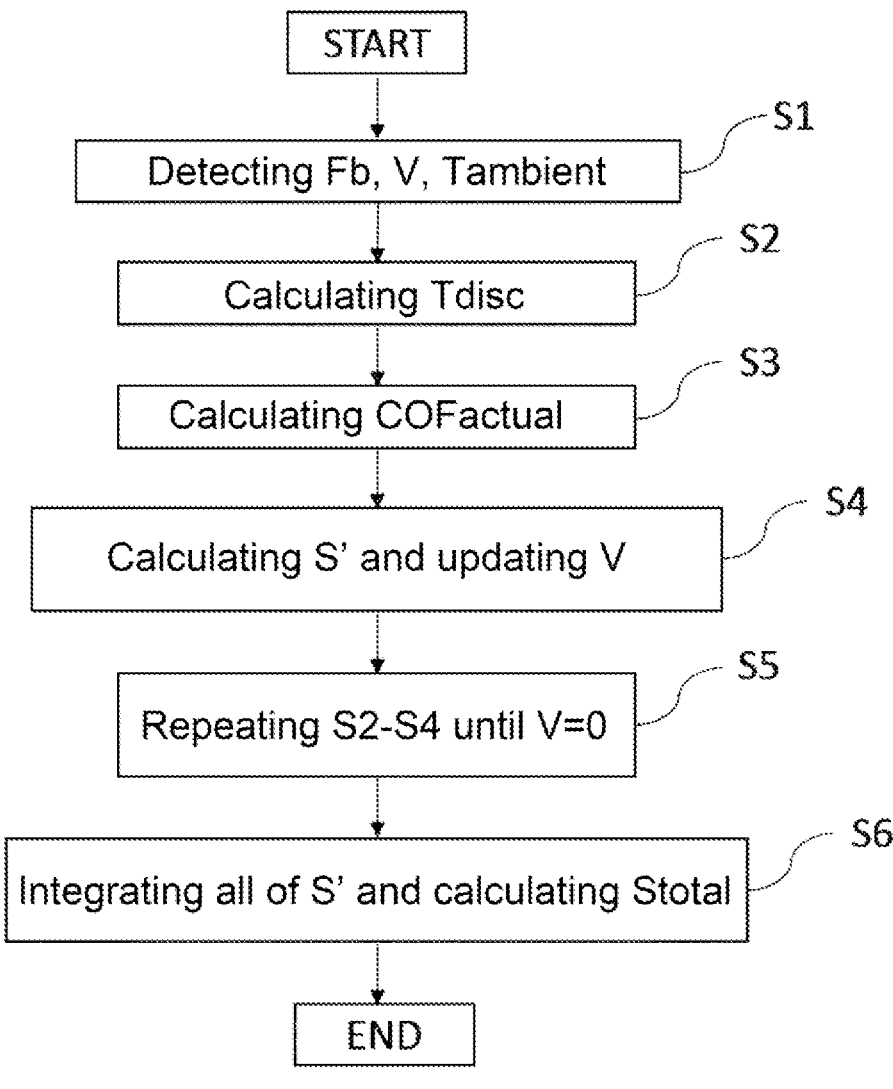
FIG. 1 shows a flow chart which shows the major operations of the method for determining a braking distance according to the disclosed embodiments.

The assumption that the Coefficient Of Friction (COF) between a brake pad and a brake disc is constant during the entire determination does however not correspond to real conditions. Therefore, the result of the calculated/estimated braking distances will often heavily deviate from real values. In actual fact, the COF is heavily dependent on temperature. While the train is travelling, the temperature of the friction layer (the disc surface or the wheel tread) varies as a function of different braking situations, for example the value of the initial speed, the value of the braking force acting on the brake disc, or of the thermal property of the brake discs. Moreover, the temperature of the friction layer increases when the train is under a heavier load.

Disclosed embodiments determine a braking distance taking into account the momentary vehicle speed, the calculated clamping force between the brake pad and the brake disc, and. in particular, a correlation between the coefficient of friction and the surface temperature. Moreover, the disclosed embodiments simultaneously take into account the heating of discs and pads, and simultaneously the change in the coefficient of friction, because the coefficient of friction influences the profile of the vehicle speed while braking, the temperature of the friction layer can be derived from the vehicle speed, and the coefficient of friction in turn is a function of the temperature of the friction layer. This means that both heating and the frictional processes are simultaneously taken into account during the deceleration procedure, since both are functions of one another, or influence one another, respectively.

Figure 2:
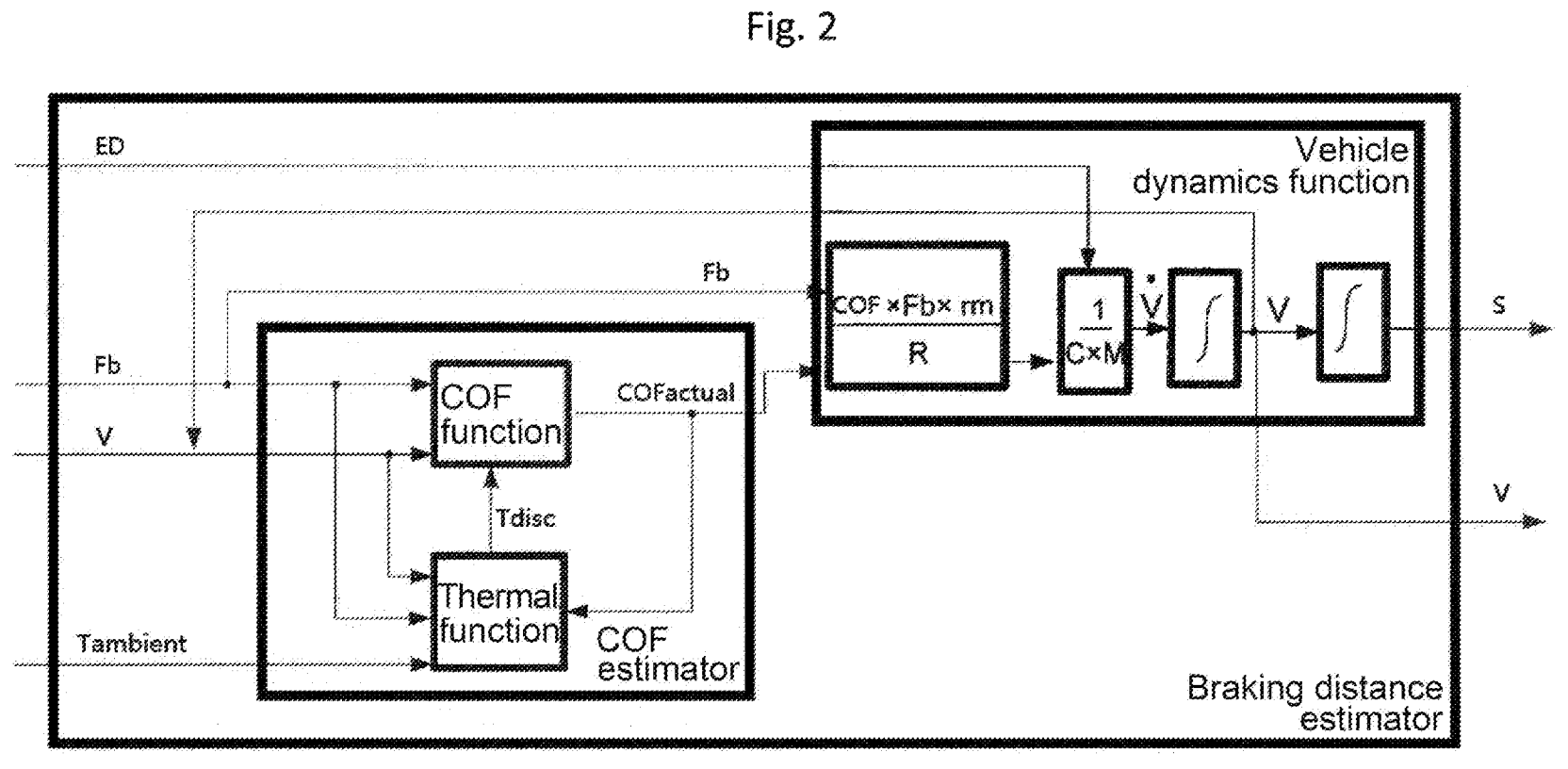

FIGS. 1 and 2 show major operations of a method according to the disclosed embodiments for determining a braking distance of a vehicle.

First, a clamping force Fb between a disc and a brake pad, a vehicle speed (initial speed) V, and an ambient temperature Tambient at the time $t_0$ when a braking procedure starts, are entered into a COF estimator of a braking distance estimator (S1). The vehicle speed V at S1 is in this instance the initial speed $V(t_0)$.

Subsequently, a temperature of the friction layer $Tdisc(t_0)$ is calculated by using a thermal function (S2), wherein the thermal function takes into account at least Fb, $V(t_0)$ and Tambient as parameters for the determination.

Thereafter, a coefficient of friction $COFactual(t_0)$ at the time $t_0$ is calculated by using a COF function (S3), wherein the thermal function takes into account at least Fb, $V(t_0)$ and $Tdisc(t_0)$ as parameters for the determination. The calculation of the coefficient of friction COF is performed by way of an empirical formula, for example in the form of $COF\_i=a+b*Fb\_(i-1)+c*FbA2\_(i-1)+d*v\_(i-1)+e*v\hat{}2\_(i-1)+f*T\_(i-1)+j*T\hat{}2\_(i-1)$, wherein a, b, c, d, e f, j are suitable selected parameters.

Subsequently, a partial braking distance $S'_1$ for a predefined temporal interval $\Delta t$ from to until $t_1$ is calculated using a vehicle dynamics function (S4), wherein $t_1$ is the assumed time for the next calculation, and $\Delta t=t_1-t_0$. The temporal interval $\Delta t$ can be set as a variable in the vehicle dynamics function. The vehicle dynamics function here takes into account at least Fb, $V(t_0)$, $COFactual(t_0)$ as parameters for the calculation. $V(t_1)$, a vehicle speed at the time $t_1$ is also calculated in parallel in S4, (wherein, Rm=mean friction radius pad/disc, R=wheel radius, m=static mass (=weight), and C is a conversion factor for static mass=>dynamic mass. Example: C=1.1 corresponds to 10% rotational mass which has to be decelerated in addition to the static mass).

In operation S5, operations S2 to S4 are repeated until the vehicle speed V corresponds to the terminal speed (for example, zero), that is to say that the braking procedure ends.

A repetition in the context of S5 will be described hereunder so as to explain the principle of the calculation of S5. Next, the thermal function uses the result of the coefficient $COFactual(t_0)$ of the last S3 and the result of the vehicle speed $V(t_1)$ of the last S4 and recalculates the temperature of the friction layer, this resulting in $Tdisc(t_1)$ (S2). Thereafter, the COF function uses the updated temperature of the friction layer $Tdisc(t_1)$ and the vehicle speed $V(t_1)$ and recalculates the coefficient of friction, this resulting in $COFactual(t_1)$ (S3). Fb here is externally predefined (for example, by brake force distribution algorithms) In simple cases Fb=constant thus is a special case. Fb remains constant during an integration operation. Tambient is not used for Fb, but only for calculating Tdisc (in each operation).

Subsequently, the vehicle dynamic function uses the new coefficient of friction $COFactual(t_1)$ and calculates a partial braking distance $S'_2$ for a temporal interval $\Delta t$ from $t_1$ to $t_2$, wherein $\Delta t = t_2 - t_1$. In parallel, the vehicle dynamics function also calculates $V(t_2)$, the latter being a vehicle speed at the time $t_2$. Thereafter, in S5, the calculations of S2-S4 for the times $t_3$, $t_4$, $t_5$, . . . are repeated until the vehicle speed is zero (V=0).

At the end, all partial braking distances $S'_1$, $S'_2$, . . . are added or integrated, respectively, and as a result an overall braking distance Stotal is calculated (S6).

Disclosed embodiments take into account the dynamic coefficient of friction COF between the discs and the pads, and the temperature of the friction layer Tdisc, wherein the COF and Tdisc are calculated and updated for all individual calculation operations. A result for the braking distance which approximates reality can be calculated/estimated therefrom. The smaller the setting of the temporal interval $\Delta t$, the more accurate the result of the overall braking distance Stotal.

The invention claimed is:

1. A computerized method for improving the accuracy of assessing braking performance of a vehicle during a braking procedure by estimating a total braking distance of a rail vehicle required for braking the rail vehicle to a complete stop using a friction brake as part of brake system performance assessment performed to ensure railway traffic safety compliance for the rail vehicle including the braking system, the method comprising:

entering a value for a clamping force between a brake pad and a brake disc of the friction brake, a vehicle speed value, and an ambient temperature value;

performing an initial calculation of a temperature value of a friction layer of the brake disc of the friction brake based on the entered clamping force value, the vehicle speed value and the ambient temperature value;

performing an initial calculation of a value for a coefficient of friction between the brake pad and the brake disc of the friction brake based on at least the entered clamping force value, the entered vehicle speed value and the initially calculated temperature value of the friction layer;

calculating an estimated partial braking distance value resulting from braking by the friction brake during an initial temporal interval of a plurality of interim temporal intervals; and calculating an estimated vehicle speed value resulting from the initial braking performed during the initial temporal interval, thereafter, iteratively performing:

calculation of the temperature of the friction layer, calculation of the coefficient of friction between the brake pad and the brake disc, calculation of an estimated partial braking distance resulting from braking by the friction brake during one or more subsequent interim temporal intervals of the plurality of interim temporal intervals, calculation of the vehicle speed estimated to result from the braking during such one or more subsequent interim temporal intervals, wherein the iterative calculations are performed until the estimated vehicle speed equals zero thereby indicating the rail vehicle has stopped moving; and adding the calculated estimated partial braking distances predicted during the plurality of interim temporal intervals together to estimate the total required braking distance;

wherein the iterative calculations performed in the estimation of the total required braking distance take into account that the coefficient of friction between the brake pad and the brake disc of the friction brake is dynamic by calculating and updating the estimated coefficient of friction and the temperature of the friction layer for all the iterative calculations performed over an entire temporal period of the braking procedure to assess the braking performance of the rail vehicle during the performance assessment performed to ensure railway traffic safety compliance for the rail vehicle including the braking system of the rail vehicle.

2. The method of claim 1, wherein in the calculation of the predicted partial braking distances calculated for the plurality of interim temporal intervals the temporal interval is adjustable.

3. A non-transitory computer program product including program code which when run on a computer processor carries out the method of claim 1.

4. A non-transitory computer program product including program code which when run on a computer processor carries out the method of claim 2.

5. The method of claim 1, wherein in the calculating of the partial braking distance S' of the temporal interval and updating V, setting of the temporal interval is adjustable.

* * * * *